United States Patent
Ygou

(10) Patent No.: US 12,103,623 B2
(45) Date of Patent: Oct. 1, 2024

(54) STEERING ELEMENT, STEERING SYSTEM AND METHOD OF MANUFACTURING A STEERING ELEMENT

(71) Applicant: ZF Lemförder Metal France SAS, Florange (FR)

(72) Inventor: Franck Ygou, Fameck (FR)

(73) Assignee: ZF Lemförder Metal France, Florange (FR)

( * ) Notice: Subject to any disclaimer, the term of this patent is extended or adjusted under 35 U.S.C. 154(b) by 0 days.

(21) Appl. No.: 18/452,706

(22) Filed: Aug. 21, 2023

(65) Prior Publication Data
US 2024/0059351 A1 Feb. 22, 2024

(30) Foreign Application Priority Data

Aug. 22, 2022 (FR) ...................... 2208436

(51) Int. Cl.
*B62D 7/20* (2006.01)
*B60G 7/00* (2006.01)
*C09D 5/08* (2006.01)

(52) U.S. Cl.
CPC ............... *B62D 7/20* (2013.01); *B60G 7/005* (2013.01); *C09D 5/08* (2013.01); *B60G 2204/416* (2013.01); *B60G 2204/422* (2013.01); *B60G 2206/012* (2013.01)

(58) Field of Classification Search
CPC ............. B62D 7/20; B60G 7/005; C09D 5/08
See application file for complete search history.

(56) References Cited

U.S. PATENT DOCUMENTS

| 7,004,485 B2 | 2/2006 | Spagnuolo et al. | |
| 10,220,666 B2 * | 3/2019 | Kuroda | ............... B60G 21/055 |
| 2014/0027995 A1 * | 1/2014 | Kuroda | ............... B60G 21/055 280/124.152 |

FOREIGN PATENT DOCUMENTS

| CN | 202022553505 U | 10/2021 |
| DE | 10 2009 002 552 A1 | 10/2010 |

* cited by examiner

*Primary Examiner* — Faye M Fleming
(74) *Attorney, Agent, or Firm* — Finch & Maloney PLLC

(57) ABSTRACT

A steering element with a steering control arm has an elongated metallic body that includes a thinner buckling section arranged between a distal part of the metallic body and a proximal part of the metallic body. An anti-corrosion coating is arranged on the metallic body on either side of the thinner buckling section over the distal part and the proximal part. A protective anti-corrosion element, different from the anti-corrosion coating, covers the whole of the thinner buckling section.

10 Claims, 2 Drawing Sheets

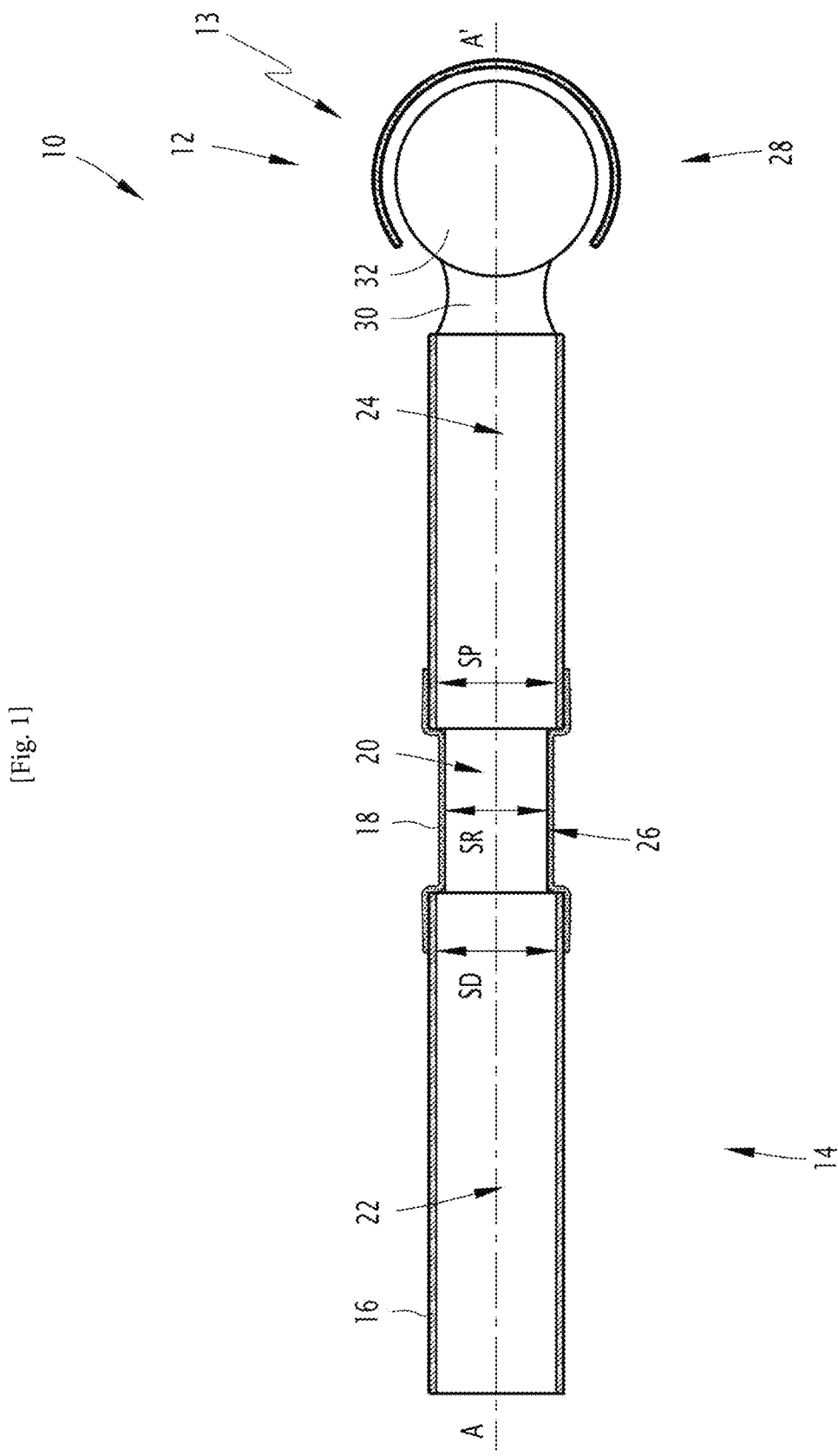

[Fig. 2]
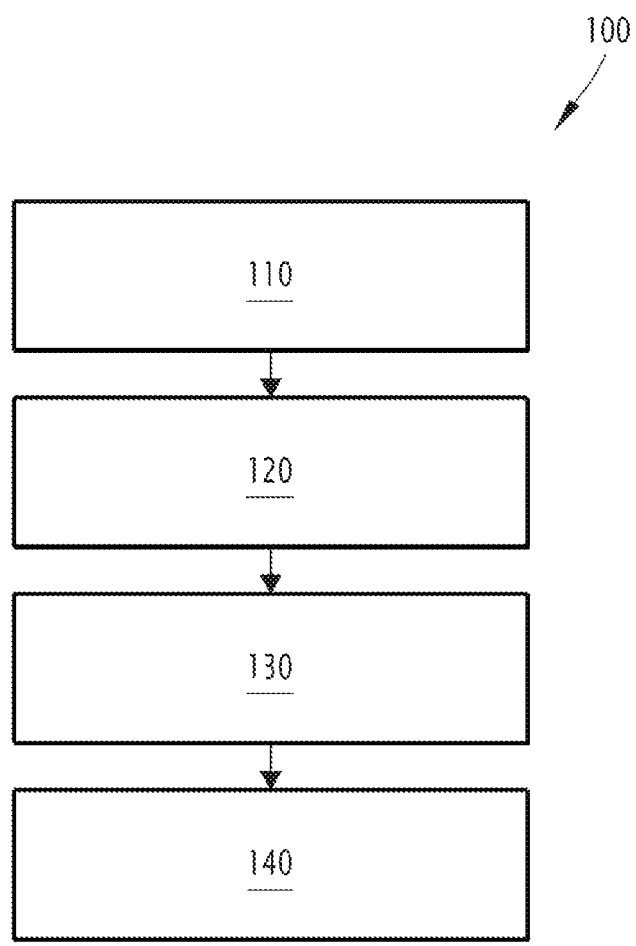

STEERING ELEMENT, STEERING SYSTEM AND METHOD OF MANUFACTURING A STEERING ELEMENT

RELATED APPLICATIONS

This application claims the benefit of and right of priority under 35 U.S.C. § 119 to French Patent Application no. 2208436, filed on 22 Aug. 2022, the contents of which are incorporated herein by reference in its entirety.

FIELD OF THE DISCLOSURE

The present invention relates to a steering element. The present invention also relates to a steering system comprising a steering element of that type. Finally, the present invention relates to a process for the production of such a steering element.

BACKGROUND

In the field of vehicle steering systems, it is common to use steering elements having an elongated metallic body, for example a metallic joint. These elements, such as steering control arms, are generally arranged under the chassis of the vehicle and for example enable the orientation of the vehicle wheels to be controlled by connecting the steering rack to the wheels.

In the case of some such elements, the elongated metallic body is provided with a thinner buckling section, for example, in order to ensure the deformation of the element if the vehicle is involved in an accident.

The elongated metallic body of such an element is generally made from a metal that can corrode, and it must therefore be protected against corrosion to ensure that the element has a satisfactory useful life.

For that purpose, it is common to use an anti-corrosion coating applied over the metallic body to prevent the spread of corrosion into the elongated metallic body.

Accordingly, elements having a thinner bucking section protected against corrosion generally comprise a coating that extends over the elongated body and over the thinner buckling section. Thus, the production of such elements involves producing the thinner buckling section, for example by machining, before the anti-corrosion coating is applied. Machining after the anti-corrosion coating has been applied is also sometimes needed, for example, in order to form the cap of the steering element. Thus, the production of such corrosion-resistant elements is complex and onerous, given that machining has to be carried out before the anti-corrosion coating is applied, and this generally requires the element to be moved several times between various production stages such as production stations during the manufacturing process.

SUMMARY

One of the goals of the invention is to propose a steering element, in particular a steering control arm, which resists corrosion but whose production is easy and economical.

To that end an object of the invention is a steering element, in particular a steering control arm, comprising:
- an elongated metallic body with a thinner buckling section arranged between a distal part of the metallic body and a proximal part of the metallic body,
in which the steering element comprises:
- an anti-corrosion coating arranged over the metallic body on either side of the thinner buckling section, over the distal and proximal parts, and
- a protective anti-corrosion element different from the anti-corrosion coating, the said protective anti-corrosion element covering the whole of the thinner buckling section.

The use of a protective anti-corrosion element different from the anti-corrosion coating and which covers the whole of the thinner buckling section is particularly advantageous because it enables the buckling section to be protected against corrosion independently of the application of the anti-corrosion coating. Thus, it is possible, for example, to machine a thinner buckling section after an anti-corrosion coating has been applied while protecting such a buckling section against corrosion. This then facilitates the production of steering elements by applying the anti-corrosion coating before any machining to form the steering element.

According to other advantageous aspects of the invention, the steering element has one or more of the following characteristics, taken in isolation or in any technically possible combination:
- the protective anti-corrosion element is a thermo-shrinking layer;
- the protective anti-corrosion element also extends over the anti-corrosion coating that extends over the distal and proximal parts, projecting beyond the thinner buckling section on either side;
- the thinner buckling section has a machined surface;
- the distal part and/or the proximal part has at least one machined section; and
- the machined section forms a neck and a joint ball.

The invention also relates to a steering system comprising a steering element as described above.

Furthermore, the invention relates to a process for the production of a steering element as described, which process has the following stages:
- provision of a blank for the elongated metallic body,
- application of the anti-corrosion coating to the blank of the elongated metallic body, including the part of the blank of the elongated metallic body that corresponds to the thinner buckling section,
- machining of the part of the blank of the elongated metallic body that corresponds to the thinner buckling section, while also locally removing the anti-corrosion coating applied, so obtaining the elongated metallic body provided with the thinner buckling section, and
- applying the protective anti-corrosion element onto the elongated metallic body, the said protective anti-corrosion element being applied to cover the whole of the thinner buckling section, so as to obtain the steering element.

According to other advantageous aspects of the invention, the production process for a steering element comprises one or more of the following characteristics, taken in isolation or in any technically possible combination:
- the machining of the part of the blank that corresponds to the thinner buckling section is carried out during the same stage as the machining of the machined section of the distal part and/or the machining of the proximal part; and
- the protective anti-corrosion element is a thermo-shrinking sheath and the stage of applying the protective anti-corrosion element onto the elongated metallic body comprises:

positioning the thermo-shrinking sheath around the elongated metallic body, around the thinner buckling section, and heating the thermo-shrinking sheath so that the thermo-shrinking sheath covers the thinner buckling section.

The invention will be better understood on reading the following description, which is given purely as a non-limiting example and which refers to the drawings, in which:

BRIEF DESCRIPTION OF THE DRAWINGS

FIG. 1 is a schematic representation viewed as a transverse section of a steering system comprising a steering element according to the invention; and FIG. 2 is a flow chart showing the various stages of the production of steering elements as depicted in FIG. 1.

DETAILED DESCRIPTION

In the description that follows, the terms "distal" and "proximal" are understood to refer to the steering system, a distal element being farther away from a user of the vehicle than a proximal element. In other words, a distal element is closer to the vehicle's wheels than a proximal element, and a proximal element is closer to the control device of the vehicle, for example the steering-wheel, than a distal element.

With reference to FIG. 1, a steering system 10 comprises a steering element 12. The steering system 10 also comprises, for example, a steering rod 13, such a steering rod 13 being, in particular, a steering rack (only part of the connection of the steering rod 13 is represented schematically in FIG. 1).

The steering system 10 is for example configured to control the orientation of the wheels of a vehicle (not shown) relative to a chassis of the vehicle (not shown). The vehicle is for example an automobile.

The steering element 12 is for example arranged under the chassis of the vehicle, i.e., between a surface on which the vehicle is resting, and the chassis of the vehicle. The steering element 12, for example, connects the steering rod 13 and the wheels of the vehicle.

The steering element 12 comprises an elongated metallic body 14, an anti-corrosion coating 16 and a protective anti-corrosion element 18.

The elongated metallic body 14 is preferably elongated in an elongation direction A-A', the elongation direction in which the steering element 12 is therefore elongated and orientated.

The elongated metallic body 14 is, for example, made of steel.

In the example illustrated in FIG. 1 the elongated metallic body 14 is a metallic pivot.

With reference to FIG. 1 the elongated metallic body 14 comprises a thinner buckling portion 20, and the distal part 22 and the proximal part 24 are preferably made of the same material or as one piece. In other words, these parts 20, 22, 24 are made from a single piece and are therefore made of the same material.

The thinner buckling portion 20, the distal part 22 and the proximal part 24 are for example aligned along the elongation direction A-A'.

The thinner buckling portion 20 is positioned between the distal part 22 and the proximal part 24.

The thinner buckling portion 20 has a machined surface 26. As will be described in more detail later, the thinner buckling portion 20 is, in particular, obtained by machining an elongated metallic body blank (the blank is not shown) to form the machined surface 26 and consequently the thinner buckling portion 20.

As will be described in more detail later, the thinner buckling portion 20 is not covered by an anti-corrosion coating 16.

A cross-section SR of the thinner buckling portion 20, measured radially relative to the elongation direction A-A', is smaller than a cross-section SD of the distal part 22 and a cross-section SP of the proximal part 24, in each case measured radially relative to the elongation direction A-A'. As shown in FIG. 1 the cross-sections SD and SP of the distal 22 and proximal 24 parts are, for example, cross-sections measured in the area adjacent to the thinner buckling section 20. The cross-sections of the thinner buckling section SR, the distal part SD and the proximal part SP correspond to cross-sections measured transversely relative to the elongation direction A-A'.

The cross-section SR of the thinner buckling portion corresponds, for example, to less than 80% of the cross-section of the distal part SD and/or that of the proximal part SP.

In the design illustrated in FIG. 1 the cross-section SD of the distal part is equal to the cross-section SP of the proximal part.

In the example shown in FIG. 1 the thinner buckling section 20 and the distal 22 and proximal 24 parts are cylindrical, in particular, with a circular cross-section. Thus, the diameter of the thinner buckling section 20 is smaller than the diameters of the distal 22 and proximal 24 parts.

The length of the thinner buckling section 20, measured along the elongation direction A-A', is for example between 10 mm and 300 mm.

The proximal part 24 extends proximally relative to the thinner buckling section 20. The proximal part 24, for example, connects the thinner buckling section 20 to the steering rod.

The distal part 22 extends distally relative to the thinner buckling section 20. The distal part 22, for example, connects the thinner buckling section 20 to one of the vehicle's wheels.

The proximal part 24 and/or the distal part 22 comprise(s) at least one machined section 28. Particularly in the example shown in FIG. 1 the proximal part 24 has a machined section 28.

As shown in the example of FIG. 1, the machined section 28 has, for example, a neck 30 and a joint ball 32. Such a machined section 28 is designed, for example, to enable the steering element 12 to be articulated relative to the rest of the steering system 10. As shown in FIG. 1, the joint ball 34 is, for example, connected to the steering rod 13.

The anti-corrosion coating 16 is arranged on the metallic body on either side of the thinner buckling section 20.

The anti-corrosion coating 16 is for example a layer of an anti-corrosion agent such as an anti-corrosion paint 16. In another design, the anti-corrosion coating 16 is a layer produced by galvanizing. In designs which are not illustrated, the anti-corrosion coating 16 can comprise several layers of different anti-corrosion agents.

The anti-corrosion coating 16 is, for example, water-tight and isolates the parts of the elongated metallic body 14 that it covers from the outside of the steering element 12.

As was seen earlier, the anti-corrosion coating 16 does not extend over the thinner buckling section 20. In effect, the anti-corrosion coating 16 is, for example, applied to a blank of the elongated metallic body before the thinner buckling section 20 has been formed. Thus, the anti-corrosion coating 16 is removed locally during the machining of the part of the blank of the metallic body that corresponds to the thinner buckling section 20.

The protective anti-corrosion element 18 is different from the anti-corrosion coating 16. For example, the protective anti-corrosion element 18 covers the whole of the thinner buckling section 20.

In particular, the protective anti-corrosion element 18 is preferably directly in contact with the machined surface 26 of the thinner buckling section 20.

The protective anti-corrosion element 18 also preferably extends at least partially over the anti-corrosion coating 16 arranged over the distal 22 and proximal 24 parts. In particular, the protective anti-corrosion element 18 extends beyond the thinner buckling section 20 on either side.

As can be seen in FIG. 1, the protective anti-corrosion element 18 extends, for example, over the distal 22 and proximal 24 parts and is supported by the anti-corrosion coating 16 that extends over the distal 22 and proximal 24 parts. Thus, the protective anti-corrosion element 18 is in contact with the anti-corrosion coating 16 that extends over the distal 22 and proximal 24 parts.

Thus, on either side of the thinner buckling section 20 the protective anti-corrosion element 18 is superposed over the anti-corrosion coating 16 and the elongated metallic body 14.

Thus, the protective anti-corrosion element 18 co-operates with the anti-corrosion coating 16 to isolate the elongated metallic body 14 from the outside of the steering element 12.

In the design illustrated in FIG. 1, the protective anti-corrosion element 18 is formed by a sheath, for example made of a plastic material.

The protective anti-corrosion element 18 is preferably hermitic or water-tight.

The protective anti-corrosion element 18 is, for example, a thermo-shrinking sheath. Such a thermo-shrinking sheath defines a fitting configuration in which the sheath delimits a fitting diameter and a thinner configuration in which the sheath delimits a thinner diameter smaller than the fitting diameter. In its fitting configuration the thermo-shrinking sheath has internal dimensions sufficient to enable it to be threaded over the thinner buckling section 20. In its thinner configuration the thermo-shrinking sheath is applied over the whole surface of the thinner buckling section 20. It can therefore be understood that the fitting configuration of the thermo-shrinking sheath is a position in which the sheath can be located relative to the thinner buckling section 20.

The thermo-shrinking sheath that forms the protective anti-corrosion element 18 is configured so as to shrink from its fitting configuration to its thinner configuration when it is heated. The thermo-shrinking sheath 18 is in particular configured so as to shrink from its fitting configuration to its thinner configuration when heated above a shrinking temperature, the said shrinking temperature being for example between 150° C. and 275° C.

The diameter of the thermo-shrinking sheath 18 in its fitting configuration is for example between 20 mm and 200 mm. The diameter of the thermo-shrinking sheath 18 in its thinner configuration is for example between 8 mm and 80 mm.

The thermo-shrinking sheath 18 is made, for example, of polytetrafluoroethylene.

A process 100 for producing a steering element 12 as described earlier will now be presented.

With reference to FIG. 2, the process comprises the following successive steps: a step 110 of provision, a step 120 of applying the anti-corrosion coating 16, a step 130 of machining and a step 140 of applying the protective anti-corrosion element 18.

During the provision step 110 a blank for the elongated metallic body is provided. The blank of the elongated metallic body is produced, for example, by forging and/or extrusion of a metallic bar to form the blank of the elongated metallic body.

During the step 120 of applying the anti-corrosion coating, the anti-corrosion coating 16 is applied onto the blank of the elongated metallic body. In this step 120 the anti-corrosion coating 16 is applied, in particular, over the whole of the blank of the elongated metallic body. In other words, the anti-corrosion coating 16 is applied not only to the part of the blank that corresponds to the distal portion 22 and the part of the blank that corresponds to the proximal portion 24, but it is also applied to the part of the blank that corresponds to the thinner buckling section 20.

During the machining step 130 the part of the blank of the elongated metallic body that corresponds to the thinner buckling section 20 is machined. In particular, the anti-corrosion coating 16 applied there is locally removed at the level of the part of the blank of the elongated metallic body that corresponds to the thinner buckling section 20. Furthermore, the part of the blank of the elongated metallic body that corresponds to the thinner buckling section 20 is machined away locally in order to form the said thinner buckling section 20.

Thus, the elongated metallic body 14 with its thinner buckling section 20 is obtained during the machining step 130.

The machining step 130 is for example carried out on a lathe, the part of the blank of the elongated metallic body that corresponds to the thinner buckling section 20 and the anti-corrosion coating covering that part before machining being removed by means of the said lathe.

The machining step 130 also comprises for example the machining of the machined section 28 of the distal part 22 and/or the proximal part 24. In other words, the machining of the machined section 28 is preferably carried out during one and the same step, and preferably at one and the same production station.

During the step 140 of applying the protective anti-corrosion element 18, the protective anti-corrosion element 18 is fitted onto the elongated metallic body 14.

The protective anti-corrosion element 18 is, in particular, fitted so as to cover the whole of the thinner buckling section 20 obtained during the machining step 130. In other words, the protective anti-corrosion element 18 is applied over the machined surface 26.

As seen earlier, the protective anti-corrosion element 18 is also preferably applied so that it projects beyond the thinner buckling section 20 on either side, over the distal 22 and proximal 24 parts.

The steering element 12 is thus obtained after the step of applying the protective anti-corrosion element 18 over the elongated metallic body 14.

When the protective anti-corrosion element 18 is a thermo-shrinking sheath, the step 140 of applying the protective anti-corrosion element 18 comprises for example positioning the thermo-shrinking sheath around the elongated metallic body 14, around the thinner buckling section 20.

After the thermo-shrinking sheath has been positioned around the elongated metallic body 14, the step 140 of applying the protective anti-corrosion element 18 then preferably entails heating the thermo-shrinking sheath so that the thermo-shrinking sheath covers the thinner buckling section 20. In particular, the thermo-shrinking sheath is heated so that it changes from its fitting configuration to its shrunk configuration around the thinner buckling section 20.

The use of a thermo-shrinking sheath is particularly advantageous for facilitating the covering of the thinner buckling section 20 and thus enables the risk of corrosion to be reduced in a cheaper manner.

A protective anti-corrosion element 18 that extends over the anti-corrosion coating 16 that extends over the distal 22 and proximal 24 parts ensures good protection of the elongated metallic body 14 against ambient humidity, and thereby effectively limits the risk of corrosion.

The invention claimed is:

1. A steering control arm, comprising:
an elongated metallic body comprising a thinner buckling section arranged between a distal part of the metallic body and a proximal part of the metallic body;
an anti-corrosion coating on the metallic body on either side of the thinner buckling section over the distal part and the proximal part; and
a protective anti-corrosion element different from the anti-corrosion coating, the protective anti-corrosion element covering the whole of the thinner buckling section.

2. The steering control arm according to claim 1, wherein the protective anti-corrosion element comprises a thermo-shrinking sheath.

3. The steering control arm according to claim 1, wherein the protective anti-corrosion element also extends over the anti-corrosion coating that extends over the distal part and the proximal part, the protective anti-corrosion element projecting on either side beyond the thinner buckling section.

4. The steering control arm according to claim 1, wherein the thinner buckling section has a machined surface.

5. The steering control arm according to claim 1, wherein the distal part and/or the proximal part comprise(s) at least one machined section.

6. The steering control arm according to claim 5, wherein the machined section forms a neck and a joint ball.

7. A steering system comprising a steering element according to claim 1.

8. A process for producing a steering control arm according to claim 1, the process comprising:
providing a blank for the elongated metallic body;
applying the anti-corrosion coating to the blank of the elongated metallic body, including over the part of the blank of the metallic body that corresponds to the thinner buckling section;
machining part of the blank of the metallic body that corresponds to the thinner buckling section, thereby locally removing the anti-corrosion coating, in order to obtain the elongated metallic body with the thinner buckling section; and
applying the protective anti-corrosion element over the elongated metallic body, the protective anti-corrosion element being applied to cover the whole of the thinner buckling section in order to obtain the steering element.

9. The process according to claim 8, wherein machining the part of the blank of the metallic body that corresponds to the thinner buckling section is carried out during the same step as the machining of the machined section of the distal part and/or of the proximal part.

10. The process according to claim 8, wherein the protective anti-corrosion element is a thermo-shrinking sheath, and applying the protective anti-corrosion element onto the elongated metallic body comprises the following steps:
positioning the thermo-shrinking sheath around the elongated metallic body opposite the thinner buckling section; and
heating the thermo-shrinking sheath so that the thermo-shrinking sheath covers the thinner buckling section.

* * * * *